April 15, 1947.  C. O. HOOVER  2,418,884
PROCESS FOR PURIFYING HYDROCARBON OILS
Filed May 15, 1945  2 Sheets-Sheet 2

INVENTOR
Charles O. Hoover
BY
Pennie Davis Marvin & Edmonds
ATTORNEYS

Patented Apr. 15, 1947

2,418,884

UNITED STATES PATENT OFFICE 2,418,884

PROCESS FOR PURIFYING HYDROCARBON OILS

Charles O. Hoover, Houston, Tex., assignor to Air Reduction Company, Incorporated, New York, N. Y., a corporation of New York Application May 15, 1945, Serial No. 593,781

12 Claims. (Cl. 196—29)

This invention relates to a method of treating hydrocarbon or mineral oils and particularly light hydrocarbon or mineral oils such as naphthas, gasoline, kerosene, water whites, raffinate and the like to remove or alter "sour compounds"; namely compounds containing sulphur and especially the organic compounds known as mercaptans as well as organic compounds which may have been formed in the oil by treatment with sulphuric acid, sulphur dioxide or other acid compounds containing sulphur.

It is the object of the invention to provide an improved method of effecting contact between the oil or other hydrocarbon undergoing treatment and the treating agent in order to ensure more effective action and resulting improvement in the results obtainable in respect to the removal or conversion of the "sour compounds."

Other objects and advantages of the invention will be apparent as it is better understood by reference to the following specification and the accompanying drawing, in which Fig. 1 is a vertical section through an apparatus suitable for the practice of the invention;

Figure 1:
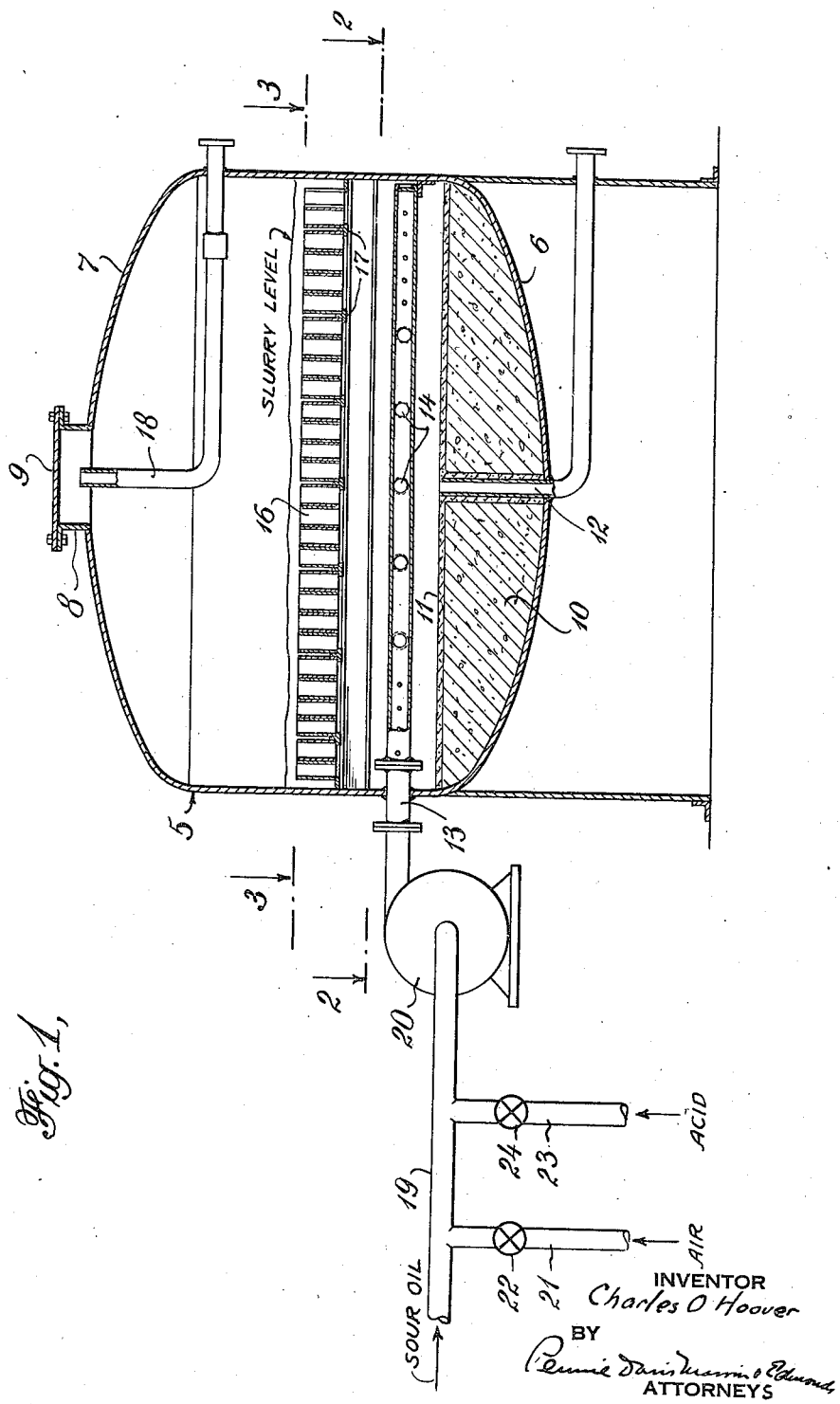
Figure 2:
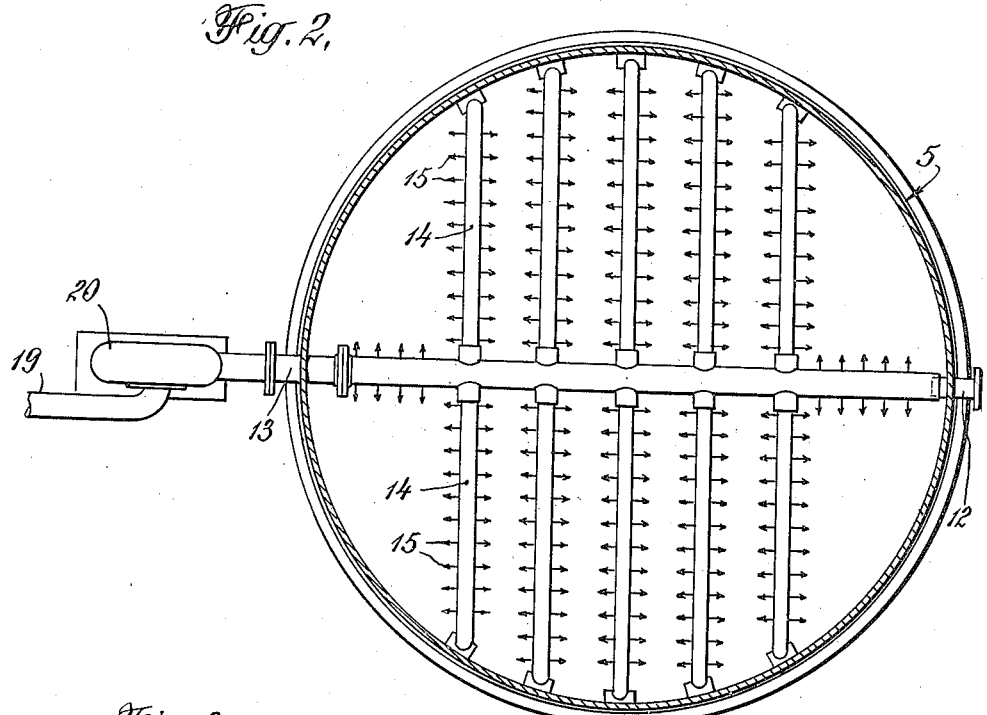
Fig. 2 is a horizontal section on the line 2—2 of Fig. 1.
Figure 3:
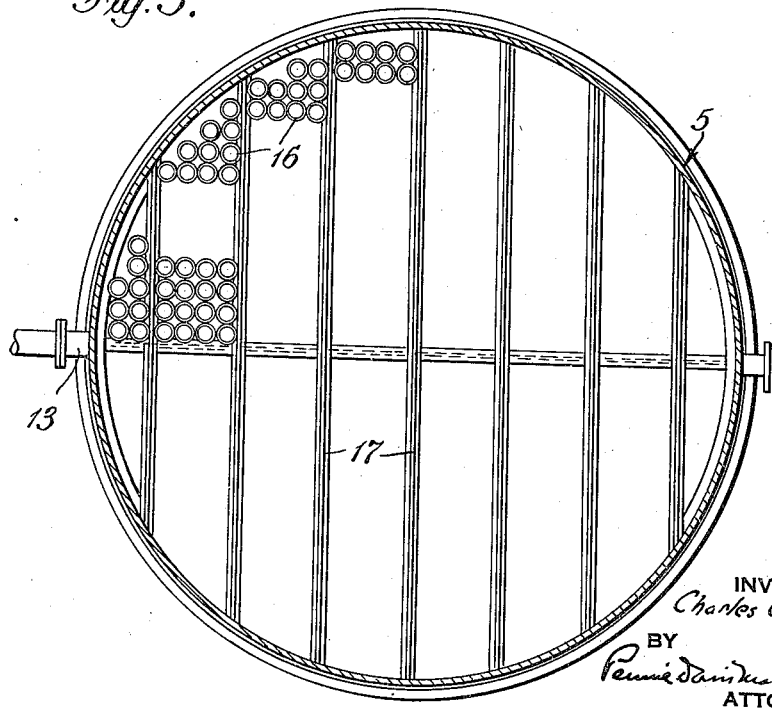
Fig. 3 is a horizontal section on the line 3—3 of Fig. 1.

In my patent Reissue 20,938, reissued December 6, 1938, I disclosed an improved method of treating hydrocarbons and mineral oils. According to the invention described in the patent, the material to be sweetened is brought into intimate contact with a compound of a metal in solid form which, even at atmospheric temperature, will effect the desired sweetening and can be revivified or regenerated for repeated use by contact with oxygen or an oxygen-containing gas, for example a compound of a metal which may be reduced from a higher to a lower valency. The intimate contact is preferably accomplished in the presence of a solid adsorbent material, for example clay of a highly adsorbent character such as fuller's earth or bentonite or like clays or in the presence of other material having adsorbent properties such as alumina or Activated Alumina.

Examples of specific metal compounds which may be employed are cupric oxide, cupric hydroxide, cupric chloride, cupric nitrate, basic cupric carbonate, mercuric chloride, ferric chloride, ferric sulphate, etc. Iron compounds usually give objectionable colorations to oils containing a high proportion of unsaturated hydrocarbon compounds, and for that reason would not be used in treating such oils when an uncolored product is desired. Cupric chloride may be used advantageously in treating naphthas, raffinate or gasoline or other oils containing high proportions of unsaturated hydrocarbon compounds.

In addition to the adsorbent material and metal compound, an oxidizing agent may be associated therewith such as alkali permanganates, for example potassium permanganate or manganate, manganese dioxide or similar oxidizing agents. Preferably, however, the metal compound used is kept in an active state by intimately mixing with the material undergoing treatment oxygen or an oxygen-containing gas such as air. However, any oxidizing agent, solid, liquid or gaseous, and capable of oxidizing the metal in the metal compound from the lower to the higher valency may be employed.

The best results are obtained by utilizing a mixture comprising from 70% to 98% of clay, with from 30% down to 2% or even less of a metal compound such for example as cupric chloride. An oxidizing agent may be included in the mixture of clay and metal compound to the extent of about 2% to 15%. This, however, is unnecessary where a liquid or gaseous oxidizing agent is used, as for example where oxygen or an oxygen-containing gas such as air is introduced with the liquid undergoing treatment.

It is advantageous, moreover, in some cases to add a small amount of an acid to the material undergoing treatment. The acid is preferably one which contains the negative radical of the metal compound. Thus, in the case of cupric chloride, it would be hydrochloric acid; in the case of cupric nitrate, it would be nitric acid, and in the case of sulphates, sulphuric acid would be used. The addition of acid in many instances increases the degree and rate of regeneration and thus assists in maintaining the method in effective operation. The addition of acid is required particularly in those cases where on account of the acidic character of the salt or metal compound in the presence of water or moisture, acid is removed by reaction with basic constituents of the clay or other adsorbent material used. The amount of acid to be added will depend upon a number of factors, including the character of the adsorbent material and the degree of hydrolysis of the salt.

I have discovered that the operation of the method of my prior patent as hereinbefore described may be improved by effecting contact with the material to be treated of the reagent comprising the metal compound and the adsorbent material in the presence of an oxidizing agent and with or without the addition of an acid by providing a slurry of the treating material and maintaining a part thereof in a quiescent slurry zone above a turbulent slurry zone. The use of such a slurry ensures the maximum of intimate contact between the material undergoing treatment and the reagent employed, and consequently the most effective sweetening effect resulting from the removal or conversion of the "sour compounds."

To accomplish the purpose, it is necessary to provide a receptacle, into the bottom of which the liquid to be treated may be introduced in a turbulent state, and to arrange in the receptacle means for maintaining a quiescent zone in which the slurry is supported by the turbulent liquid beneath it. An outlet above the quiescent zone permits decantation of the clear effluent liquid which has been freed from "sour compounds" and which rises from the quiescent zone.

The liquid employed in the slurry should be the same liquid which is being treated, so that the effluent is not contaminated with extraneous material. The solid portion of the slurry may be a mixture such as that defined in Reissue 20,938, such material being preferably in a fine state of division such for example that it passes completely through a 100 mesh screen and most of it passes through a 200 mesh screen. It may be desirable in some cases to use a particle size in which most of the material will pass through a 300 mesh screen and all of it will pass through a 200 mesh screen. The size of the particles will vary with the viscosity and rate of flow of the liquid.

The proper functioning of the method and apparatus depends upon the maintenance of a proper balance between the linear velocity of the liquid and the rate of fall of the solid particles in the slurry and also upon the concentration of the solid particles in the liquid forming the slurry. In a proper slurry, the volume of dry solids used should be from 25% to 75% of the volume of liquid used. In general, a volume of dry solids equal to 50% of the volume of the liquid used will be suitable.

Turbulence below the quiescent zone is also essential. The liquid must be maintained in constant movement throughout to prevent stratification of the solids into layers of different sized particles and to ensure intimate contact between the gaseous oxidizing agent, the treating compound and the material undergoing treatment. The quiescent slurry is not completely static. Some of the particles will fall into the turbulent zone and return therefrom. Thus, some of the slurry will descend to form a relatively dense turbulent slurry zone where contact with the material undergoing treatment is first effected. The solid particles rising to the quiescent zone are held therein.

When the linear velocity and rate of flow are properly balanced and the slurry is of proper consistency, the slurry will perform its function of maintaining effective contact between the material being treated and the reagent. Since a wide variety of materials having different characteristics may be treated, it is obviously necessary to determine by experimentation the desirable factors for most efficient operation in any particular case.

Apparatus adapted for the purpose may be varied in form. A practical apparatus for the purpose is illustrated in the drawing, in which 5 indicates a cylindrical receptacle vertically disposed with a bottom 6 and top 7, the latter having a manhole 8 and cover 9 to facilitate access for cleaning and repair. The bottom is preferably filled to the desired level with concrete 10 having a neat cement topping 11 forming the floor of the receptacle. Any other smooth, corrosion-resistant material may be substituted. An outlet pipe 12 extends through the floor and bottom of the receptacle to facilitate discharge of the slurry and the introduction of fresh slurry material to the receptacle.

Above the level of the floor of the receptacle an inlet pipe 13 is connected to a spider consisting of a multiplicity of arms 14 having perforations indicated by the arrows 15, through which the liquid to be treated is introduced and discharged at a velocity which ensures uniform agitation in the turbulent zone. When the apparatus is first placed in operation, the slurry will rest upon the floor of the receptacle, and the introduction of the liquid to be treated will agitate it and cause it to rise as the liquid level rises.

The quiescent zone is formed at a level above the arms 14 of the spider by providing a multiplicity of relatively short tubular members 16 supported upon a framework 17 of angle or T-irons welded to form a grid. Conveniently the tubular members may be sections of steam boiler tubes cut to the proper length and tacked together by welding. The tubular members 16 afford a multiplicity of conduits of relatively small dimensions, and in passing upwardly and into these conduits the turbulence of the liquid rising through them is eliminated, thereby affording the quiescent zone in which the velocity of the rising liquid is balanced against the rate of fall of the solid particles of the slurry. Two slurry zones are thus maintained, the upper being quiescent and the lower, turbulent. As the liquid rises continuously, the minute particles of solid material suspended therein are held in the quiescent zone. The liquid rising from the quiescent zone into the upper part of the receptacle is entirely free from such particles and may be withdrawn continuously through an overflow pipe 18 having its open end disposed preferably at the level of the manhole 8.

The liquid to be treated is supplied through a pipe 19 and pump 20, the latter being connected to the inlet pipe 13. Oxygen, or gas containing oxygen such as air, may be delivered to the pipe 19 through a pipe 21 controlled by a valve 22 in the event that a gaseous oxidizing agent is employed in the method. The amount of gaseous oxidizing agent introduced should be limited to avoid the formation of a separate gaseous phase in the quiescent zone. Similarly, where acid is to be introduced, it may be delivered to the pipe 19 through a pipe 23 controlled by a valve 24 and mingled with the liquid which is delivered through the pipe 13 to the apparatus.

The size of the equipment and the amount of slurry required will depend, of course, upon the nature of the material which is being treated. The equipment illustrated in the drawing is designed to have a capacity of 250 barrels of oil per hour, and for the purpose of treating such oil the apparatus is charged with a slurry composed of 475 pounds of a mixture of 80% of adsorbent clay and 20% of cupric chloride and 4593 pounds (18 barrels) of oil. The receptacle is 9 feet in diameter by 8 feet in height, with a volume of 508 cubic feet. The bottom of the frame supporting the tubular members is 1 foot 5 inches above the floor of the receptacle. In operation, the slurry upper level is approximately 2 feet above the floor, and the volume of the receptacle to the slurry upper level approximately 170 cubic feet. The amount of air and of acid introduced during the operation will vary widely, depending upon the particular material treated and the reagent used and can be determined readily under any particular conditions by experimentation to secure the most effective operation.

In treating various materials, it will be necessary to effect adjustments in respect to various factors and particularly the linear velocity of the liquid treated in relation to the rate of fall of the solid particles in the slurry. However, these factors can be determined readily in each specific operation and in such an operation the factors will not change. Hence it is possible to apply the principles to various hydrocarbon liquids and mineral oils.

Various changes may be made in the details of the apparatus and in the procedure as described without departing from the invention or sacrificing the advantages thereof.

I claim:

1. The method of treating sour hydrocarbon oil which comprises passing the oil in the presence of an added oxidizing agent and an added mineral acid successively through a turbulent zone and a superposed quiescent zone, each consisting of a slurry of solid particles comprising a mixture of an adsorbent material and a copper compound suspended in the hydrocarbon oil.

2. The method of treating sour hydrocarbon oil which comprises passing the oil in the presence of an added gaseous oxidizing agent successively through a turbulent zone and a superposed quiescent zone, each consisting of a slurry of solid particles comprising a mixture of an adsorbent material and a copper compound suspended in the hydrocarbon oil.

3. The method of treating sour hydrocarbon oil which comprises passing the oil in the presence of an added oxidizing agent successively through a turbulent zone and a superposed quiescent zone, each consisting of a slurry of solid particles comprising a mixture of an adsorbent material and a copper compound suspended in the hydrocarbon oil, and withdrawing the oil from a zone above the slurry.

4. The method of treating sour hydrocarbon oil which comprises passing the oil in the presence of an added oxidizing agent through a turbulent slurry of solid particles comprising a mixture of an adsorbent material and a compound of copper which form mercaptides with mercaptans, and thence through a superposed quiescent portion of the same slurry.

5. The method of treating sour hydrocarbon oil which comprises passing the oil in the presence of an added oxidizing agent and an added mineral acid through a turbulent slurry of solid particles comprising a mixture of an adsorbent material and a compound of copper which form mercaptides with mercaptans, and thence through a superposed quiescent portion of the same slurry.

6. The method of treating sour hydrocarbon oil which comprises passing the oil in the presence of an added oxidizing agent successively through a turbulent zone and a superposed quiescent zone each consisting of a slurry of solid particles comprising a mixture of an adsorbent material and a compound of copper suspended in the hydrocarbon oil, the compound of copper being one which forms mercaptides with mercaptans.

7. The method of treating sour hydrocarbon oil which comprises passing the oil in the presence of an added oxidizing agent successively through a turbulent zone and a superposed quiescent zone each consisting of a slurry of solid particles comprising a mixture of an adsorbent material and a compound of copper suspended in the hydrocarbon oil, the compound of copper being one which forms mercaptides with mercaptans, and withdrawing the oil from a zone above the slurry.

8. The method of treating sour hydrocarbon oil which comprises passing the oil in the presence of an added oxidizing agent and an added mineral acid successively through a turbulent zone and a superposed quiescent zone each consisting of a slurry of solid particles comprising a mixture of an adsorbent material and a compound of copper suspended in the hydrocarbon oil, the compound of copper being one which forms mercaptides with mercaptans.

9. The method of treating sour hydrocarbon oil which comprises passing the oil in the presence of an added oxidizing agent and an added mineral acid successively through a turbulent zone and a superposed quiescent zone each consisting of a slurry of solid particles comprising a mixture of an adsorbent material and a compound of copper suspended in the hydrocarbon oil, the compound of copper being one which forms mercaptides with mercaptans, and withdrawing the oil from a zone above the slurry.

10. The method of treating sour hydrocarbon oil which comprises passing the oil in the presence of an added gaseous oxidizing agent successively through a turbulent zone and a superposed quiescent zone each consisting of a slurry of solid particles comprising a mixture of an adsorbent material and a compound of copper suspended in the hydrocarbon oil, the compound of copper being one which forms mercaptides with mercaptans.

11. The method of treating sour hydrocarbon oil which comprises passing the oil in the presence of an added gaseous oxidizing agent and an added mineral acid successively through a turbulent zone and a superposed quiescent zone each consisting of a slurry of solid particles comprising a mixture of an adsorbent material and a compound of copper suspended in the hydrocarbon oil, the compound of copper being one which forms mercaptides with mercaptans.

12. The method of treating sour hydrocarbon oil which comprises passing the oil in the presence of an added oxidizing agent successively through a turbulent zone and a superposed quiescent zone each consisting of a slurry of solid particles comprising a mixture of an adsorbent material and copper chloride suspended in the hydrocarbon oil.

CHARLES O. HOOVER.

REFERENCES CITED

The following references are of record in the file of this patent:

UNITED STATES PATENTS

| Number | Name | Date |
| --- | --- | --- |
| 2,284,273 | Franklin | May 26, 1942 |
| 2,329,930 | Nebeck | Sept. 21, 1943 |
| 2,284,272 | Franklin et al. | May 26, 1942 |